(12) United States Patent
Venkatram

(10) Patent No.: US 7,066,630 B1
(45) Date of Patent: Jun. 27, 2006

(54) INTEGRATED POINTER HUB AND WARNING INDICATOR

(75) Inventor: Sanjiv Venkatram, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/868,851

(22) Filed: Jun. 17, 2004

(51) Int. Cl.
*B60Q 3/04* (2006.01)
*G01D 11/28* (2006.01)

(52) U.S. Cl. ............................ 362/489; 362/23; 362/28

(58) Field of Classification Search ................ 362/489, 362/26, 27, 28, 29, 23, 30; 116/288, 300, 116/286, 293, 298, 302, 304
See application file for complete search history.

(56) References Cited

U.S. PATENT DOCUMENTS 5,458,082 A    10/1995  Cookingham
6,182,601 B1   2/2001   Baatz
6,382,127 B1   5/2002   Wehner
6,408,784 B1   6/2002   Ross
6,959,995 B1*  11/2005  Ikarashi et al. ............... 362/23

* cited by examiner

*Primary Examiner*—Thomas M. Sember
*Assistant Examiner*—Guiyoung Lee
(74) *Attorney, Agent, or Firm*—Daniel R. Edelbrock

(57) ABSTRACT

A gauge or dial has multiple displays for indicating various vehicle operating conditions. Pointers indicate a range of measured values on some of the displays. A fixed hub covers ends of the pointers where they connect with their drive shafts and extend through the dial. The hub has a display screen with a graphic or symbol imprinted on it. A conduit directly under the hub on an opposite side of the dial extends to a printed circuit board. A light emitting diode is mounted on the printed circuit board within the conduit. Light from the diode is reflected through the conduit to backlight the symbol on the display screen. Switching on and off of the diode is controlled in response to sensing or measurement of a vehicle condition or vehicle component operation, such as a turn signal.

20 Claims, 5 Drawing Sheets

INTEGRATED POINTER HUB AND WARNING INDICATOR

BACKGROUND OF THE INVENTION

1. Field of the Invention

This invention relates in general to illuminated instrument clusters in vehicles and more specifically to a compact consolidation of lighted indicators on a single dial or gauge.

2. Discussion of Related Art

Instrument clusters on the instrument panels of vehicles today often use backlighting to illuminate a dial or gauge and the associated pointer. More instruments and displays, such as for navigational, entertainment, radar and the like functions, are becoming increasingly practical and popular. This raises a need for more compact traditional vehicle information displays to allow or provide space for these other components. U.S. Pat. No. 6,382,127 illustrates one attempt to provide multiple information sources on a single dial face. Commonly assigned and co-pending U.S. patent application Ser. No. 10/824,472, filed Apr. 15, 2004, provides an example of how reflectors on the underside of the dials can be used to distribute light of different colors to various areas of the display surface. But the use of such reflectors does not appear to have been significantly expanded within the art to provide efficient use of backlighting for different types of displays on a single dial or gauge face.

As disclosed in U.S. Pat. No. 6,408,784, a cap fits over a body member of a pointer where the pointer connects to its drive shaft. The cap is molded with or attached to the pointer such that it rotates with the pointer when the pointer is turned by the drive shaft. The cap has a transparent panel just above the drive shaft. Light traveling along the drive shaft illuminates the panel. Graphics or indicia can be imprinted on the panel to provide a lighted display. Since the transparent panel rotates with the cap and pointer, any symbol on the panel would also rotate. This would make any indicator requiring a single or upright orientation, such as a turn signal, impractical. The cap is large relative to the pointer length, suggesting that it would cover a lot of area on the dial face that could be used to present other information. In addition, since the cap member is attached to the pointer drive shaft, it can only act as a hub for a single pointer, severely limiting the ability to use multiple pointers, and therefore a plurality of information displays, on a single dial face.

SUMMARY OF THE INVENTION

Accordingly, it is an object of this invention to provide a fixed pointer hub that further serves as a warning indicator.

Another object of the invention is to make more efficient use of space on a vehicle indicating instrument.

A further object of the invention is to efficiently backlight multiple informational displays on a single instrument panel gauge.

In carrying out this invention in the illustrative embodiment thereof, an instrument gauge or dial having multiple pointers and informational displays is mounted on a light reflector having two parts. The two part reflector is attached to a printed circuit board (PCB). The pointers have tip ends for indicating measured values on the dial, and tail ends connected to drive shafts extending through the dial to step motors secured on the PCB. A cover or hub is placed over the tail ends of the pointers. The hub has a transparent window or pane with a graphic or symbol imprinted or otherwise marked on the pane.

A first part of the reflector reflects light to evenly and efficiently backlight the informational displays. The hub is attached to a second part of the reflector that comprises a light conduit extending to the PCB. A light emitting diode is mounted on the PCB within the conduit. The light conduit is enclosed and offset from the pointer drive shafts such that light transmitted to the pane of the hub is not dispersed or interfered with by light provided to illuminate other display segments on the dial.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE PREFERRED EMBODIMENT

Figure 1:
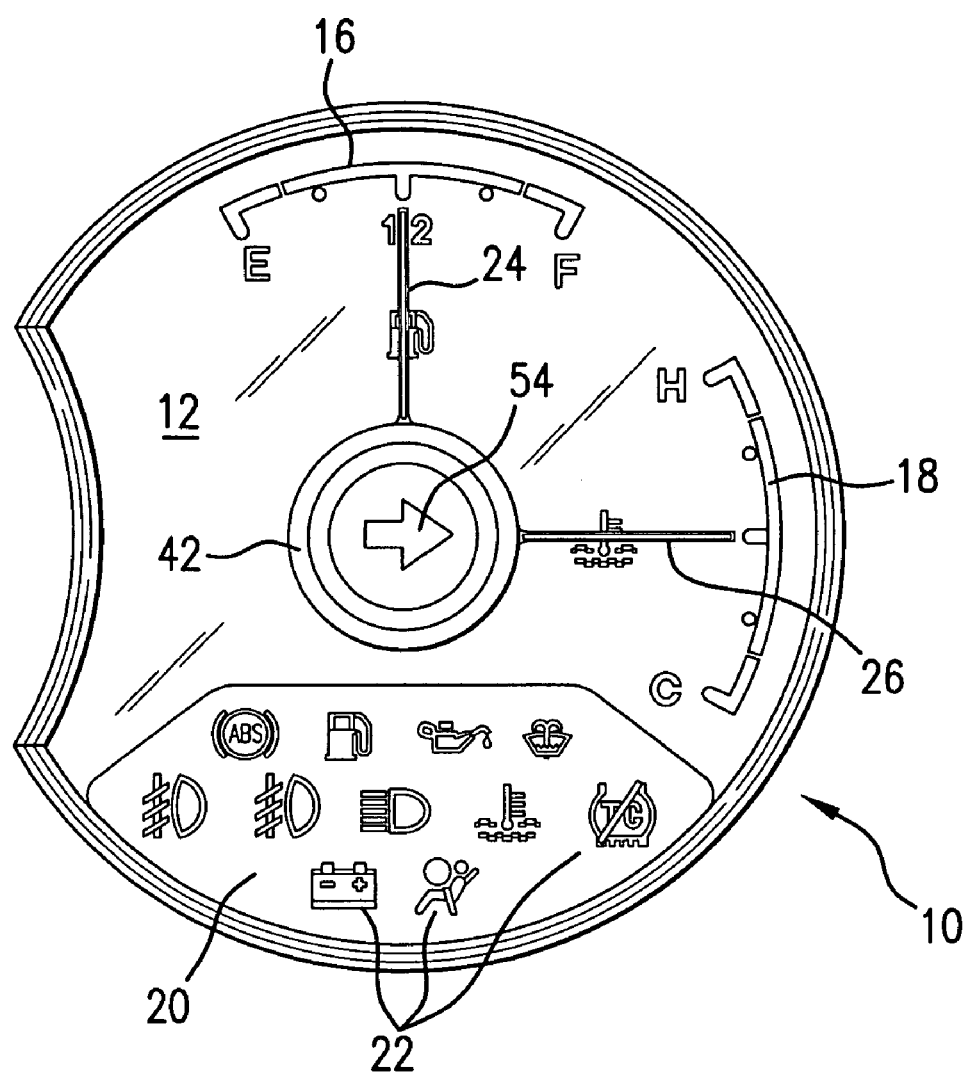
FIG. 1 is a top or front view of a dial design according to the present invention
Figure 4:
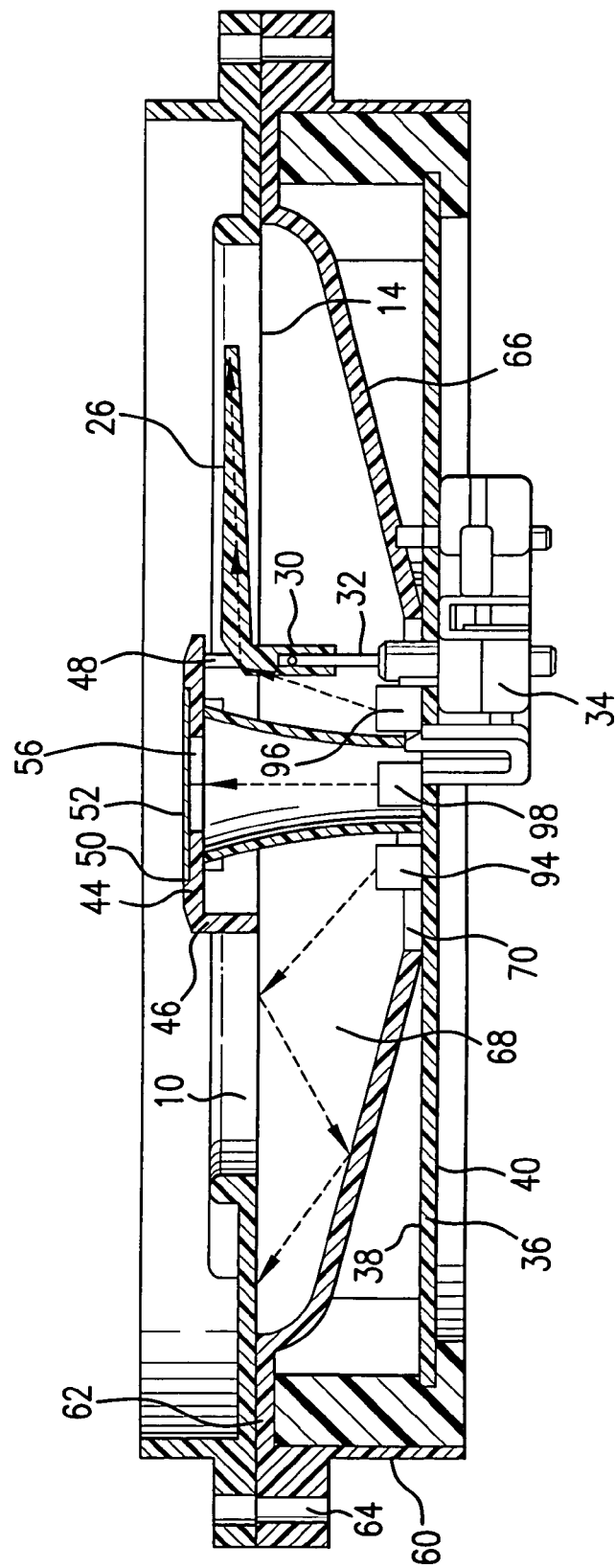
FIG. 4 is partial, cross-sectional side view of the invention assembly.

Referring now to FIGS. 1 and 4, a gauge or dial 10 has a front or display face 12 including indicia for identifying various vehicle parameters, and a rear face 14. In the illustrated example, there is a fuel display 16 and a temperature display 18. The dial is manufactured from transparent plastic. Ink of selected colors is printed on the plastic in the preferred pattern of the background field and display indicia. On a lower part of the dial there is a panel 20 tinted a different color than the background field, with various imprinted graphics or symbols 22. The symbols 22 include, for examples, a low-fuel indicator, a headlight high-beam indicator, a seat belt indicator, etc. for informing or warning a vehicle driver about various operating conditions.

Figure 3:
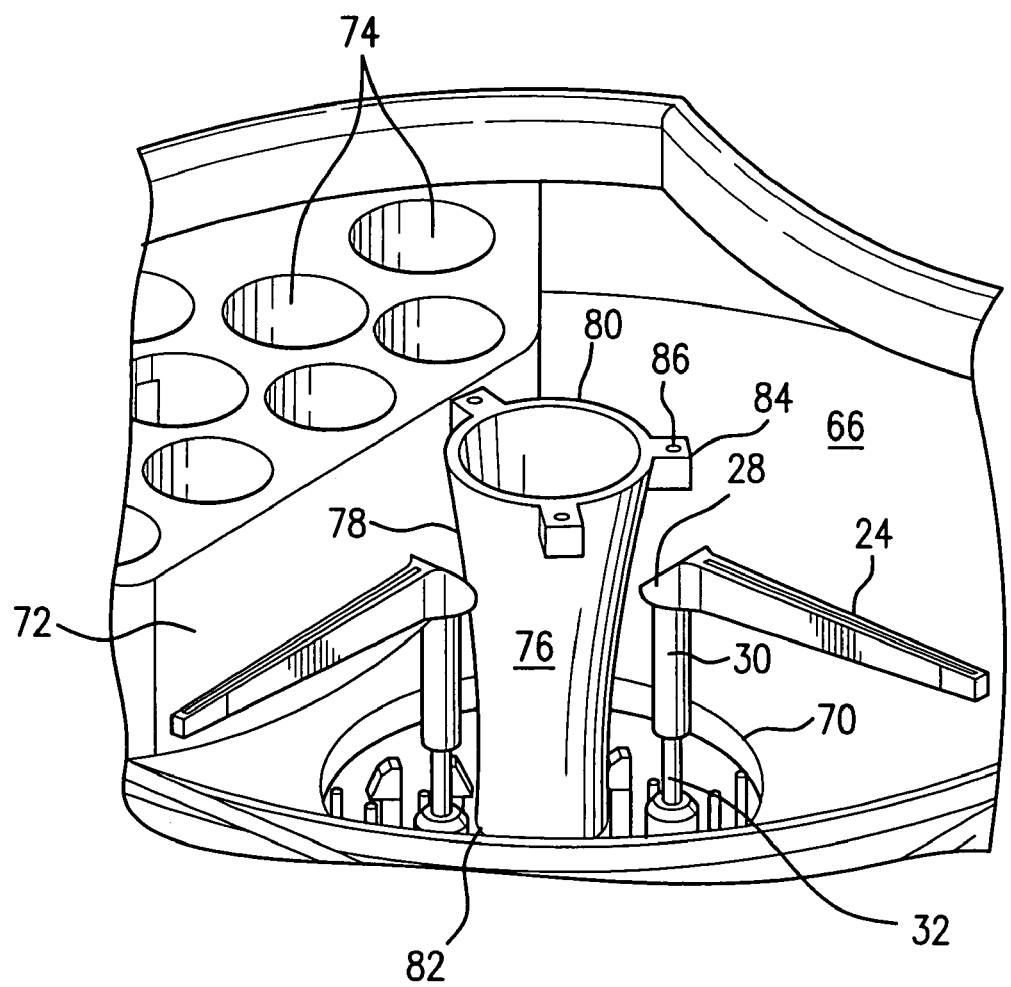
FIG. 3 is a partial, enlarged perspective view of a conduit behind the dial for providing light to the pointer hub.

Pointers 24 and 26 are used to identify various measured values on the displays 16 and 18, respectively. As illustrated in FIGS. 3 and 4, the pointers have tail sections 28 formed with hollow cylindrical portions 30 that fit over drive shafts 32. The drive shafts extend from stepper motors 34 (only one is shown). The stepper motors are mounted on a printed circuit board (PCB) 36. The PCB has a first side 38 and a second, underside 40. The stepper motors are mounted on the underside 40 and the drive shafts 32 pass through the PCB. The PCB is spaced from the rear face 14 of the dial 10.

A pointer hub 42, best shown in FIGS. 1 and 4, covers the tail sections 28 of the pointers. The hub comprises a circular ring 44 having an outer rim 46 extending perpendicular to the plane of the ring. The ring 44 and rim 46 are made from a suitable plastic such as Polypropylene. The rim fits against the display face 12 of the dial and supports the ring in a position spaced above the display face. The rim has slots 48 through which the pointers project. The slots are wide enough to allow full range of movement of the pointers 24 and 26 along the fuel and temperature displays 16 and 18, respectively. Within the circular ring 44 is a recess in the form of a circular ledge 50 for supporting a sheet or pane 52. The pane 52 is made, for example, from transparent Polycarbonate. The pane is screen-printed a dark color such as black except for the shape of a graphic or symbol 54 indicating a warning or other signal. In the illustrated embodiment, the symbol is a turn signal. There is a central aperture 56 through the ring or recess under the pane 52.

Figure 2:
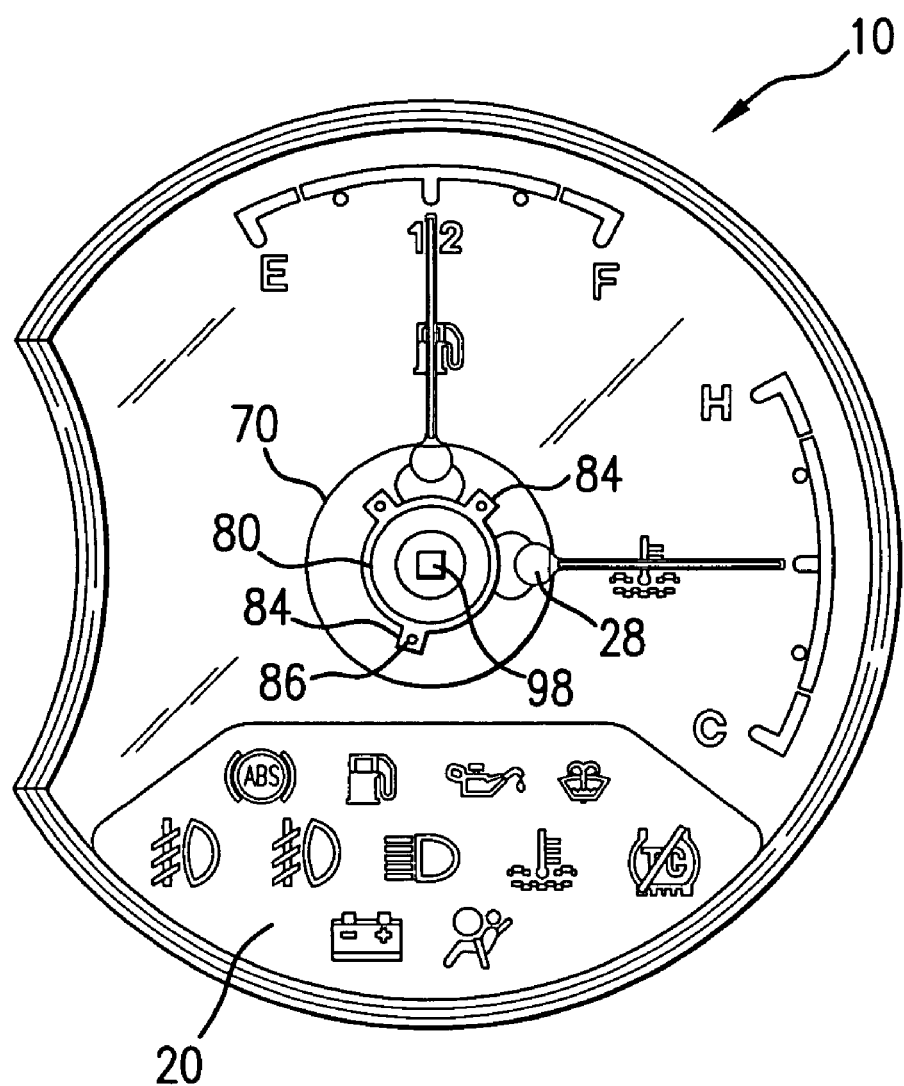
FIG. 2 is a top or front view of the dial with a pointer hub removed.

FIGS. 3 and 4 also illustrate a reflector 60 having a first component with a base 62 on to which the dial 10 is attached in conventional manner, for example by fasteners (not shown) extending through apertures on an outer perimeter or mask of the dial and apertures 64 on the reflector base. The reflector in turn is assembled on or against the PCB 36. The reflector is molded from a plastic such as Acrylonitrile Butadiene Styrene or Polypropylene and is white in color to maximize reflection properties. The reflector has a semi-bowl-shaped reflecting surface 66 that, with the rear face 14 of the dial, forms a light reflecting chamber 68. An opening 70 in the reflector surface 66 opposite the dial exposes an area on the first side 38 of the PCB to the chamber 68. The first component of the reflector 60 includes block section 72 (FIG. 3) with inner light reflecting cavities or channels 74 for providing light to the various graphics or symbols 22 on the panel 20 (FIGS. 1 and 2).

The reflector 60 has a second component formed from the same white-colored plastic. As best shown in FIGS. 3 and 4, the second component comprises a centrally located, funnel-shaped, hollow tube or conduit 76 extending through a central aperture in the dial and sandwiched between an underside of the ring 44 of the pointer hub 42 and the exposed area of the PCB 36. The conduit 76 has a main body 78 with a first end 80 at a wider section of the funnel shape for positioning immediately adjacent the central aperture 56 of the hub under the pane 52. A second end 82 is at a narrower section of the main body 78 for positioning against the PCB 36. Tabs 84, best shown in FIGS. 2 and 3, with pin holes 86 extend outward from the first end 80. These pin holes receive snap pins (not shown) extending from an underside of the ring 44 of the hub 42 to fix the hub in a stationary position on the conduit over the dial 10. The hub could be fixed to the conduit in other ways, such as by an interference fit or adhesive, or alternatively could be secured in some manner to the dial front face 12 with the underside of the ring 44 against the conduit first end 80.

Figure 5:
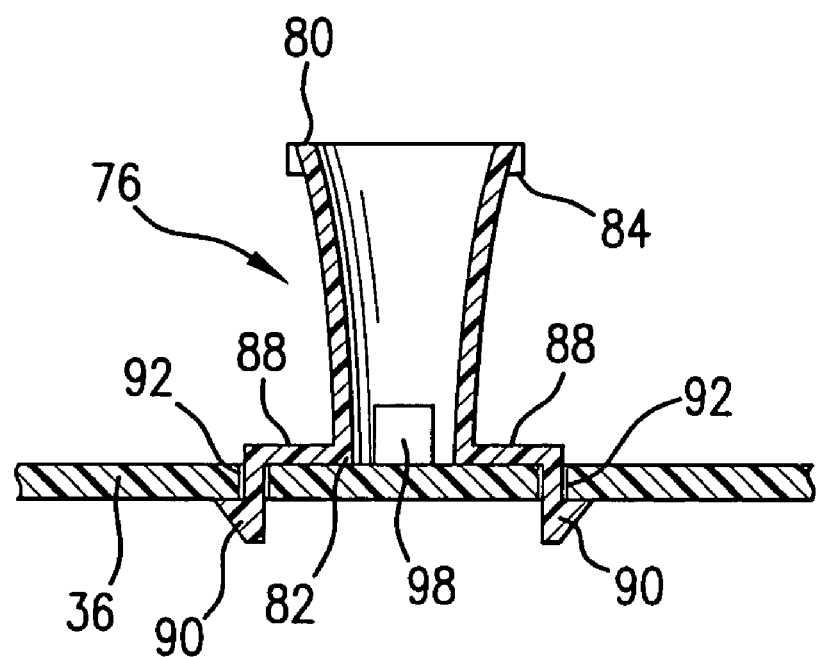
FIG. 5 is a partial, cross-sectional side view of the conduit and integral structure for attaching the conduit to a printed circuit board.

FIG. 5 depicts one possible way of attaching the conduit 76 to the PCB 36. As shown in cross-section in FIG. 5, the conduit has relatively narrow legs 88 extending generally perpendicular to the main body at second end 82. At ends of the legs distal from the main body are downwardly extending, generally hook-shaped catches or projections 90 configured to snap into accommodating holes 92 on the exposed area of the PCB 36 to secure the conduit 76 in an upright position on the PCB.

Light sources are mounted on the exposed area of the PCB and connected by printed circuits (not shown). The light sources are represented in FIG. 4 as light emitting diodes. Light emitting diodes 94 (only one is shown) backlight the dial face. Light emitting diodes 96 (again, only one is illustrated) positioned adjacent the cylindrical portions 30 of the tail sections 28 of the pointers 24 and 26 transmit light along and illuminate the pointers. Light emitting diode 98 is positioned within the narrower section of the funnel shape of the conduit 72, such that the conduit provides a light channel to the hub 42. The light emitting diode 98 sends light, reflected by an inner wall of the conduit, to the pane 52 in the hub 42, backlighting the graphic or symbol 54 on the hub as desired. In the illustrated example of the turn signal, the light emitting diode 98 would be green in color. The diode 98 would be turned on and off in sequence by, for example, a microprocessor receiving and transmitting the information that a turn signal lever has been manipulated by a vehicle driver.

The pointer hub 42 prevents light from leaking out of the pointer optics located close to the stepper motors. The warning indicator represented is illustrated as a turn signal indicator, but could be other types of warnings such as for seatbelt, airbag, etc. not fit on the panel 20. The light emitting diode 98 positioned on the PCB 36 at a base of the conduit 76 shines upward along the conduit to illuminate the turn signal indicator. Since the conduit is sandwiched between the PCB and a rear inner surface of the pointer hub, light leakage to the surrounding areas of the dial is completely prevented. The design adds an aesthetic appeal to the cluster, as well as presenting a more compact information center.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A pointer hub assembly comprising:
    a cover;
    a slot means in the cover for allowing a pointer to extend and operate through a range of movement relative to the cover;
    a transparent pane supported on the cover;
    a light conduit, the cover being mounted on the light conduit such that the transparent pane is positioned over the conduit; and
    a means for securing the light conduit and cover in a stationary position relative to the pointer as the pointer operates through the range of movement.

2. The pointer hub assembly of claim 1 further comprising a circuit board, the securing means attaching the light conduit to the circuit board.

3. The pointer hub assembly of claim 2 further comprising a light source mounted on the circuit board within the light conduit.

4. The pointer hub assembly of claim 3 wherein the light source is a light emitting diode.

5. The pointer hub assembly of claim 1 further comprising a graphic imprinted on the transparent pane.

6. The pointer hub assembly of claim 5 wherein the graphic is a turn signal direction indicator.

7. The pointer hub assembly of claim 1 further comprising additional slot means in the cover for allowing additional pointers to extend and operate through additional ranges of movements.

8. An indicating assembly comprising:
    a dial having indicia;
    a pointer having a first end for indicating particular indicia and a second end;
    a cover fit over the second end of the pointer, the cover having a transparent part;
    a first reflector component positioned under the dial;
    a second reflector component positioned directly under the cover, the cover being fixed on the second reflector in a stationary position relative to the dial and pointer;

a first light source associated with the first reflector for illuminating the dial; and a second light source associated with the cover for backlighting the transparent part of the cover.

9. The indicating assembly of claim 8 further comprising a circuit board for controlling the light sources, the second reflector being secured to the circuit board around the second light source.

10. An instrument comprising:

a dial having indicia;

at least one pointer for indicating particular indicia based on measured values, each of the at least one pointers having a drive shaft such that there is at least one drive shaft passing through the dial;

a stationary hub for covering the at least one drive shaft where the at least one drive shaft passes through the dial, the hub having a display face;

a circuit board;

an enclosed conduit extending from the circuit board to the display face of the hub, the enclosed conduit being offset from the at least one pointer drive shaft; and a light source mounted on the circuit board within the enclosed conduit for illuminating the hub display face.

11. The instrument of claim 10 wherein the display face comprises a transparent sheet positioned on the hub over the conduit.

12. The instrument of claim 11 further comprising a symbol located on the transparent sheet.

13. The instrument of claim 10 wherein the conduit is funnel-shaped.

14. The instrument of claim 13 wherein a wide end of the funnel-shaped conduit abuts against the hub.

15. The instrument of claim 10 further comprising a reflector for distributing light to the dial and indicia.

16. The instrument of claim 15 wherein the reflector includes channels for distributing light to specific positions on the dial.

17. The instrument of claim 10 wherein the light source is a light emitting diode.

18. The instrument of claim 10 wherein the hub is fastened to an end of the conduit.

19. The instrument of claim 10 wherein an end of the conduit is secured to the circuit board.

20. The instrument of claim 19 further comprising means on the conduit for attaching the end of the conduit to the circuit board.

* * * * *